United States Patent [19]

Droescher et al.

[11] 4,345,839
[45] Aug. 24, 1982

[54] DEVICE FOR CONTROLLING THE POSITION OF A DRIFT ADVANCING MACHINE

[75] Inventors: Bernhard Droescher; Alfred Zitz, both of Zeltweg, Austria

[73] Assignee: Voest-Alpine Aktiengesellschaft, Vienna, Austria

[21] Appl. No.: 114,600

[22] Filed: Jan. 23, 1980

[30] Foreign Application Priority Data

Mar. 14, 1979 [AT] Austria ................................. 1920/79

[51] Int. Cl.³ ............................................. G01B 11/00
[52] U.S. Cl. ................................. 356/400; 356/153; 37/DIG. 19
[58] Field of Search ............... 356/138, 153, 399, 400, 356/401; 33/264, 286; 37/DIG. 19

[56] References Cited

U.S. PATENT DOCUMENTS

| | | | |
|---|---|---|---|
| 3,462,845 | 8/1969 | Matthews | 356/138 |
| 3,708,232 | 1/1973 | Walsh | 37/DIG. 19 |
| 3,778,169 | 12/1973 | Adams | 356/399 |
| 3,816,000 | 6/1974 | Fiedler | 356/400 |
| 4,034,490 | 7/1977 | Teach | 356/400 |

*Primary Examiner*—R. A. Rosenberger
*Attorney, Agent, or Firm*—Cushman, Darby & Cushman

[57] ABSTRACT

In apparatus for controlling the position of a drift advancing machine having a longitudinal axis: two light beam sources or laser beam sources spaced longitudinally from the machine, the sources emitting beams which are parallel to each other and to the drift axis and which are in different vertical planes extending longitudinally of the drift; and two beam receivers arranged on the machine, the receivers being in transversely spaced apart positions relative to the longitudinal axis of the machine, and the transverse distance between the receivers corresponding to the transverse distance between the two beams.

8 Claims, 2 Drawing Figures

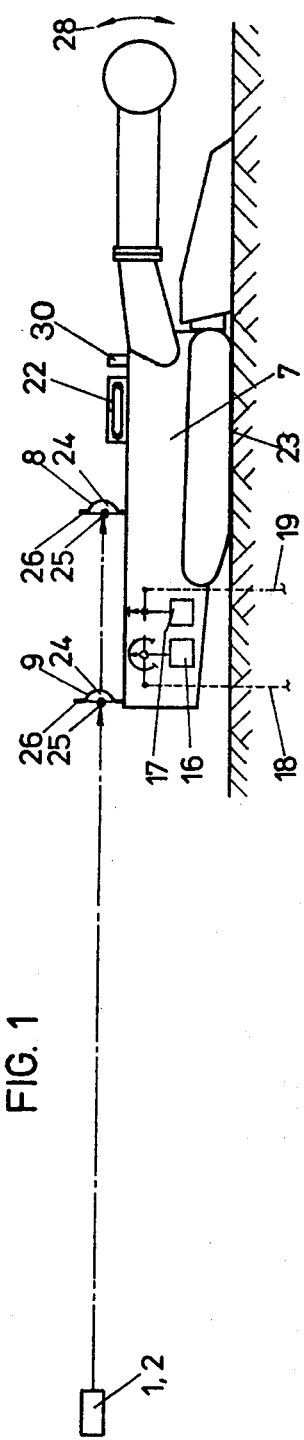
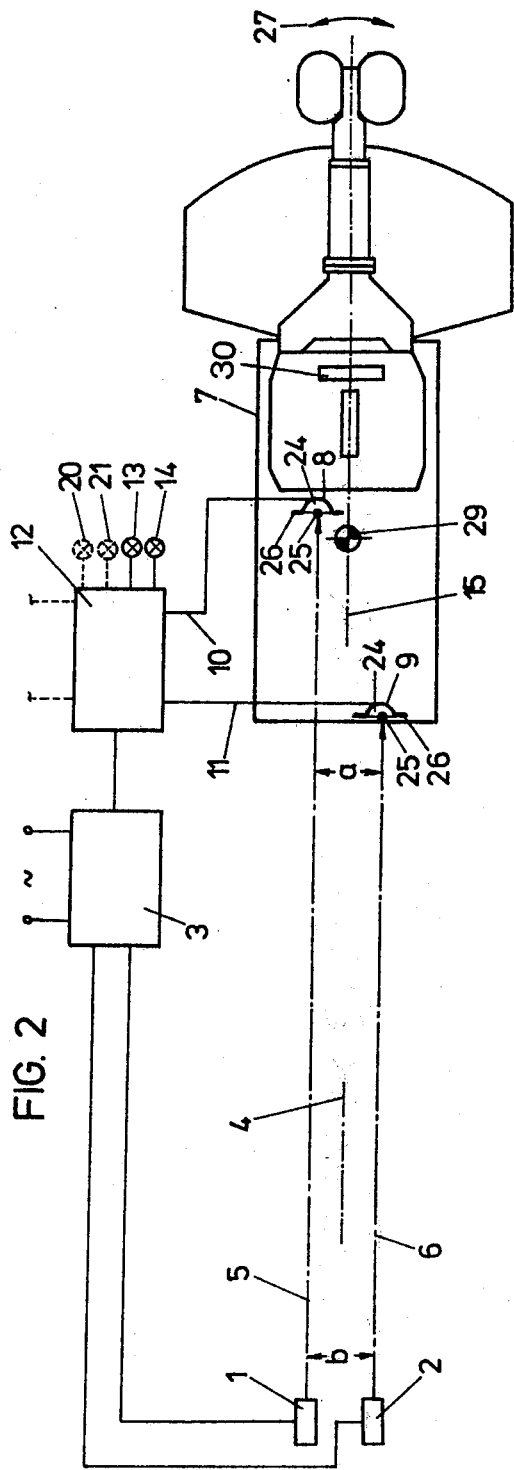
FIG. 1
FIG. 2

DEVICE FOR CONTROLLING THE POSITION OF A DRIFT ADVANCING MACHINE

The present invention refers to a device for controlling the position of a drift advancing machine by using light beams or laser beams emitted at a distance from the drift advancing machine, comprising at least one light receiver or laser receiver arranged on the drift advancing machine. There are already known several such devices in which, as a rule, a laser source is stationarily arranged in a drift cross section and in which by means of a complex and expensive circuitry, being therewith also partially subject to disturbances, informations concerning the positions of the drift advancing machine are being worked up. There are further known devices for controlling and, respectively, delimiting, the operational movement of the relieving tool with consideration of the position of the drift advancing machine. These devices are, for example, so-called positively controlled control means in which the momentary position of the relieving tool can be represented in accordance with the desired position of the drift profile and is to be checked. Also these devices are quite complex and thus, as a matter of course, also subject to disturbances.

The present invention now aims at providing a simple device for controlling the position of a drift advancing machine and for indicating any deviation of the machine from the desired position by releasing a signal, for example an optically receivable signal, whereupon the required corrective measures can be effected. For resolving this task, the invention is essentially characterized by two light beam sources or laser beam sources emitting light or laser beams, the two light or laser beams being parallel to each other and to the drift axis and being in different vertical planes extending in longitudinal direction of the drift, and by two receivers for light beams or laser beams, respectively, being arranged on the drift advancing machine transversely staggered to the axis of the drift advancing machine, the lateral staggering of said receivers corresponding to the distance between the emitted beams. In drift advancing machines, any deviation from the desired position can have its origin in a horizontal parallel deviation, in a vertical parallel deviation, in an inclined position relative to the drift axis, in an upward or downward inclination angle or in a rolling angle of the machine. In a device according to the invention, all these miss-adjustments can be recognized in a simple manner, noting that a parallel shift of the drift advancing machine relative to the drift axis has as a consequence that both receivers do not receive any signals at all. Any oblique position of the drift advancing machine is characterized by one of both receivers not receiving any signal anymore. Upward inclination and, respectively, downward inclination can, as well as a rolling angle, be recognized by the omission of signals in both receivers and by control means known per se, for example an angle coder, a gravity inclinometer or a liquid-gauge. A vertically parallel deviation is indicated by the omission of any signals in both receivers, noting that control by means of a water-gauge or the like does not indicate any deviation. By means of a device according to the present invention, all possible miss-positions of a drift advancing machine can be determined with a minimum in expenditure.

For achieving a higher sensibility of a device according to the invention on any deviation of the desired position, the arrangement is preferably such that the receivers arranged on the drift advancing machine are arranged in staggered position relative to the longitudinal direction of the drift advancing machine. Such a longitudinally staggered position of the receivers (relative to the longitudinal direction of the drift advancing machine) has as an effect that only minor deviations from the desired position, particularly any minor oblique position relative to the drift axis, will generate a signal indicating a miss-position of the machine. Preferably the arrangement is such that one of both receivers is arranged on the drift advancing machine near to the gravity center or, respectively, the vertical pivotal axis of the drift advancing machine, preferably coinciding with the pivotal axis. In this manner, an only minor oblique position of the drift advancing machine can be recognized by the receiver being most distant from the vertical pivotal axis of the drift advancing machine not receiving any signal. In view of one of both receivers being arranged adjacent the center of gravity, the correct desired position of the drift advancing machine can be reestablished in a simple manner because only the second receiver must be adjusted to receive the second light beam or laser beam, respectively. Preferably, the light sources or laser sources arranged at a distance from the drift advancing machine are arranged in a horizontal plane of the drift cross section and preferably in one and the same drift cross section and the receivers arranged on the drift advancing machine are arranged in a plane extending in parallel relation to the running surface of the machine, so that a device according to the invention can be adjusted in a simple manner.

A device according to the invention shall tolerate a certain deviation from the desired position and for this purpose the arrangement is preferably such that the receivers are provided with a parabolic reflector and that the detector for the light beam or laser beam is arranged at the focal point of the reflector. In this manner, the reflector can be designed in a simple manner and be adapted for generating signals indicating any miss-position when corrective measures are actually required. For facilitating any corrections, the receivers are designed such that they are surrounded of concentric surfaces of translucent material, for example a ground screen consisting of glass or synthetic plastics material. In this manner, any signal of the light source or laser source no more received by the respective receiver becomes visible as a light point on the concentric surfaces around the receiver and this light point can be seen from a position in front of the machine as well as from a position behind this machine because the concentric surfaces are made of translucent material. These concentric surfaces will thus behave as control surfaces immediately making visible the type of deviation just occurring. The extent of admissible deviation is preferably defined by giving the parabolic reflector of the receiver suitable dimensions, said reflector preferably having a diameter of approximately 20 centimeters and being surrounded by an annular ground screen.

For releasing an optical or accustical signal, the receivers are advantageously connected to a measuring circuit. For reliably coordinating the received signal to the actual deviation from the desired position and, respectively, for attaining a greater precision for the angle of upward or downward inclination as well as for the rolling angle, in addition to the light beam or laser beam receivers, gravity inclinometers, liquid-gauges and/or preferably rotational potentiometers or angle coders, are provided on the drift advancing machine, which are, preferably, equally connected to the measuring circuit.

The invention is further illustrated with reference to the drawing schematically showing an embodiment of the device according to the invention.

In the drawing, FIG. 1 is a longitudinal section through a drift and a device according to the invention and FIG. 2 is a top-plan view of the arrangement shown in FIG. 1.

The laser sources arranged within the drift cross section are designated 1 and 2 in FIG. 2 and energized by a circuitry 3. The lasers 1 and 2 are emitting in parallel direction to the drift axis 4 laser beams 5 and 6 which are received by receivers 8 and 9 arranged on the drift advancing machine 7 in case the drift advancing machine is assuming the desired position. The receivers 8 and 9 are, via conduits 10 and 11, connected with a measuring circuit 12 to which are connected indication lamps 13 and 14. The receivers are arranged in a transversely staggered position relative to the longitudinal axis 15 of the drift advancing machine 7 and the lateral distance a of these receivers is corresponding to distance b of the beams 5 and 6 emitted by the laser sources 1 and 2 in a direction parallel to the drift axis 4.

As is shown in FIG. 1 and 2, gravity inclinometers 16 and 17 are arranged on the drift advancing machine 7, the signals of which are, via conduits 18 and 19, equally supplied to the measuring circuit 12, noting that additional indicating lamps 20 and 21 can be provided. In addition or in place of the inclinometers, liquid-gauges 22 and 30 can be provided on the drift advancing machine. As can be seen in FIG. 1, the receivers 8 and 9 are arranged in a staggered position relative to the longitudinal direction of the drift advancing machine, noting that the receiver 8 is arranged adjacent the center of gravity 29 of the drift advancing machine. The receivers 8 and 9 are arranged within a plane which parallely extends to the running surface 23 of the caterpillar drive of the drift advancing machine. The laser beams 5 and 6 shall also be emitted within this plane for achieving an unambiguous coordination and a simple adjustment possibility.

The receivers 8 and 9 comprise parabolically shaped reflectors 24. At the focal point of each of these parabolic reflectors 24 a detector 25 for light beams or laser beams is arranged. Annular discs 26 of translucent material, for example polyvinyl chloride, are arranged around these parabolic reflectors. In case of deviations of the drift advancing machine 7 from its desired position exceeding an extent in which the laser beams 5 and 6 do no more hit an area of the parabolic reflector 24 a corresponding signal is generated for energizing the indication lamps 13 and 14 or for generating an accustical signal. Simultaneously, the type of deviation becomes visible by a light point on a concentric annular surface 26, noting that this light point can be seen from a position in front of the machine as well from a position behind the machine.

In case of an oblique position of the machine as indicated by the double-arrow 27 of FIG. 2, the parabolic reflector 24 of the receiver 9 will first be removed from the area of action of the laser beam 6 and, therewith, a corresponding signal will be generated to energize, for example, the indication lamp 14. The direction of any oblique position as indicated by double-arrow 27 can immediately be recognized on an area of the annular disc 26 acting as control surface and showing a light point. In case of an upward inclination or a downward inclination, the drift advancing machine 7 will deviate from its desired position in any direction of double-arrow 28 of FIG. 1. Also in this case, the receiver 9 will first indicate an omitted signal, because the receiver 8 is located nearer to the center of gravity of the drift advancing machine and to the running surface of the caterpillar drive. Whether the deviation be an upward deviation or a downward deviation can again be recognized in a simple manner on the annular surface 26 surrounding the parabolic reflector 24 of the receiver 9 or on the liquid-gauge 22 or on the inclinometer 16. Any parallel shift of the machine 7 in height direction or in lateral direction will be indicated by the omission of signals from both receivers 8 and 9, noting that the direction of any parallel shift can be derived from the partial areas of the annular surfaces 26 of the parabolic reflectors 24 in which partial areas of both annular surfaces 26 a light point will become visible. Any rolling angle can in a siple manner be indicated by the gravity inclinometer 17 or by the liquid-gauge 30, noting that such deviations from the desired position need not necessarily generate a signal from the receivers 8 or 9. Such a signal will, as a rule, only be generated if a substantial miss-position of the machine has occurred, and for this purpose the signals derived from the angle coder and, respectively, of the gravity inclinometer are equally supplied to the acustical or optical control means for timely effecting corrective measures.

What is claimed is:

1. In apparatus for controlling the position of a drift advancing machine along a desired drift axis, said machine having a longitudinal axis: two light beam sources or laser beam sources spaced longitudinally from the machine along the desired drift axis, said sources emitting beams which are parallel to each other and to the desired drift axis and which are in different vertical planes extending longitudinally of the drift; and two beam receivers arranged on the machine and longitudinally spaced-apart relative to the longitudinal axis of the machine, said receivers being in transversely spaced-apart positions relative to the longitudinal axis of the machine, and the transverse distance between said receivers corresponding to the transverse distance between the two beams.

2. Apparatus as in claim 1 wherein one of said receivers is located adjacent the center of gravity of said machine.

3. Apparatus as in claim 1 wherein the two beam sources are located in a single horizontal plane of the drift cross section and wherein the two receivers are located in a plane parallel to the running surface of the machine.

4. Apparatus as in claim 1 wherein each receiver includes a parabolic reflector and a beam detector located at the focal point of the reflector.

5. Apparatus as in claim 1 wherein each parabolic reflector is surrounded by an annular disc of translucent material.

6. Apparatus as in claim 1 wherein the annular disc is a ground plate of glass or synthetic material.

7. Apparatus as in claim 1 including a measuring circuit connected to the receivers, the measuring circuit including optical or acoustical indicator means.

8. Apparatus as in claim 1 including a measuring circuit to which the receivers are connected and gravity inclinometers connected to the measuring circuit.

* * * * *